United States Patent
Miwa et al.

(10) Patent No.: US 10,452,368 B2
(45) Date of Patent: Oct. 22, 2019

(54) RECORDING MEDIUM HAVING COMPILING PROGRAM RECORDED THEREIN, INFORMATION PROCESSING APPARATUS, AND COMPILING METHOD

(71) Applicant: FUJITSU LIMITED, Kawasaki-shi, Kanagawa (JP)

(72) Inventors: Hideki Miwa, Kawasaki (JP); Yuta Mukai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/997,738

(22) Filed: Jun. 5, 2018

(65) Prior Publication Data
US 2018/0357053 A1    Dec. 13, 2018

(30) Foreign Application Priority Data
Jun. 7, 2017    (JP) .................................. 2017-112473

(51) Int. Cl.
*G06F 8/41*    (2018.01)
*G06F 8/51*    (2018.01)
*G06F 9/30*    (2018.01)

(52) U.S. Cl.
CPC .............. *G06F 8/443* (2013.01); *G06F 8/452* (2013.01); *G06F 8/51* (2013.01); *G06F 9/30065* (2013.01)

(58) Field of Classification Search
CPC ......................... G06F 8/41–51; G06F 9/30065
(Continued)

(56) References Cited

U.S. PATENT DOCUMENTS 8,131,931 B1* 3/2012 Roberts ................. G06F 12/121
711/118
2007/0050603 A1 3/2007 Vorbach et al.
(Continued)

FOREIGN PATENT DOCUMENTS

JP    10-207772    8/1998
JP    2005-535055  11/2005
(Continued)

OTHER PUBLICATIONS

McKinley, K., et al., Improving Data Locality with Loop Transformations, ACM Transactions on Programming Languages and Systems (TOPLAS), vol. 18 Issue 4, Jul. 1996, pp. 424-453, [retrieved on Aug. 5, 2019], Retrieved from the Internet.*
(Continued)

*Primary Examiner* — Geoffrey R St Leger
(74) *Attorney, Agent, or Firm* — Fujitsu Patent Center

(57) ABSTRACT

A storage medium includes: converting, when a first instruction in an innermost loop of loop nests of a source code is executed, the source code such that a second instruction is executed which writes data in cache lines written by execution of the first instruction to be executed a count later in the innermost loop; calculating, when a first conversion code including the second instruction based on a first current iteration count is executed, a first value indicating a first rate; calculating, when a second conversion code including the first instruction based on a second current iteration count is executed, a second value indicating a second rate; comparing the first and second values; and converting a loop nest having the first value larger than the second value and a loop nest having the second value larger than the first value into the first and second conversion codes, respectively.

20 Claims, 19 Drawing Sheets

(58) Field of Classification Search
USPC .................................................. 717/140–161
See application file for complete search history.

(56) References Cited

U.S. PATENT DOCUMENTS

| | | | | |
|---|---|---|---|---|
| 2009/0119461 | A1* | 5/2009 | Cypher | G06F 12/0808 |
| | | | | 711/141 |
| 2009/0172296 | A1* | 7/2009 | Tsuji | G06F 12/0802 |
| | | | | 711/143 |
| 2011/0161600 | A1* | 6/2011 | Hirano | G06F 9/30043 |
| | | | | 711/141 |
| 2012/0233488 | A1* | 9/2012 | Burchard | G06F 1/3228 |
| | | | | 713/500 |
| 2017/0344506 | A1* | 11/2017 | Park | G06F 13/28 |

FOREIGN PATENT DOCUMENTS

| | | |
|---|---|---|
| JP | 2011-138213 | 7/2011 |
| WO | 2004/015568 | 2/2004 |

OTHER PUBLICATIONS

Carr, S., et al., Compiler Optimizations for Improving Data Locality, Proceedings of the Sixth International Conference on Architectural Support for Programming Languages and Operating Systems (ASPLOS-VI), Oct. 1994., 11 pages, [retrieved on Aug. 5, 2019], Retrieved from the Internet.*

* cited by examiner

FIG. 4

```
integer(kind=4) :: i,j
integer(kind=4),intent(in) :: n,m
real(kind=8),intent(in) :: a(n+p,m), b(n,m)
do j=1, m
  do i=1, n
    a(i,j) = b(i,j)
  end do
end do
```

FIG. 5

```
integer(kind=4) :: i,j
integer(kind=4),intent(in) :: n,m
real(kind=8),intent(in) :: a(n+p,m), b(n,m)
do j=1, m
  do i=1, n-64,16
    XFILL(a(i+64,j)) !!! GENERATE XFILL INSTRUCTION
    a(i+0,j) = b(i+0,j)
    a(i+1,j) = b(i+1,j)
    a(i+2,j) = b(i+2,j)
    :
    a(i+15,j) = b(i+15,j)
  end do
  do i=n-64+1, n
    !!! DO NOT GENERATE XFILL INSTRUCTION
    a(i,j) = b(i,j)
  end do
end do
```

FIG. 6

```
integer(kind=4) :: i,j
integer(kind=4),intent(in) :: n,m
real(kind=8),intent(in) :: a(n+p,m), b(n,m)
do j=1, m
  do i=1, n-192,32
    XFILL(a(i+64,j)) !!! GENERATE XFILL INSTRUCTION
    a(i+0,j) = b(i+0,j)
    a(i+1,j) = b(i+1,j)
    a(i+2,j) = b(i+2,j)
    :
    a(i+31,j) = b(i+31,j)
  end do
  do i=n-192+1, n
    !!! DO NOT GENERATE XFILL INSTRUCTION
    a(i,j) = b(i,j)
  end do
end do
```

FIG. 7

```
integer(kind=4) :: i,j
integer(kind=4),intent(in) :: n,m
real(kind=8),intent(in) :: a(n+p,m), b(n,m)
do j=1, m-1
  do i=1, n,32
    XFILL(a(i,j+1)) !!! GENERATE XFILL INSTRUCTION
a(i+0,j) = b(i+0,j)
    a(i+1,j) = b(i+1,j)
    a(i+2,j) = b(i+2,j)
    :
    a(i+31,j) = b(i+31,j)
  end do
end do
do j=m, m
 !!! DO NOT GENERATE XFILL INSTRUCTION do i=1, n
    a(i,j) = b(i,j)
  end do
end do
```

US 10,452,368 B2

RECORDING MEDIUM HAVING COMPILING PROGRAM RECORDED THEREIN, INFORMATION PROCESSING APPARATUS, AND COMPILING METHOD

CROSS-REFERENCE TO RELATED APPLICATION

This application is based upon and claims the benefit of priority of the prior Japanese Patent Application No. 2017-112473, filed on Jun. 7, 2017, the entire contents of which are incorporated herein by reference.

FIELD

The embodiments discussed herein are related to a recording medium having a compiling program recorded therein, an information processing apparatus, and a compiling method.

BACKGROUND

For example, in a computer (hereinafter, also referred to as an information processing apparatus) including a cache memory, a value in a register is written in a main memory.

The related art is disclosed in Japanese National Publication of International Patent Application No. 2005-535055, Japanese Laid-open Patent Publication No. 10-207772, or Japanese Laid-open Patent Publication No. 2011-138213.

SUMMARY

According to an aspect of the embodiments, a non-transitory computer-readable storage medium recording a compiling program which causes a computer to execute a process, the process includes: converting, when a first instruction included in an innermost loop of loop nests of a source code, the source code in such a manner that a second instruction which writes specific data in a target area of a cache memory including one or more cache lines which are written from a main memory by an execution of a first instruction to be executed a specific count later in the innermost loop; calculating, when a first conversion code including the second instruction in which an identification of the target area is performed based on a first current iteration count of the first instruction in the innermost loop is executed, a first value, for each loop nest, indicating a first rate by which a count of reading of the one or more cache lines is reduced; calculating, when a second conversion code including the first instruction in which an identification of the target area is performed based on a second current iteration count of the first instruction in an outer loop of the innermost loop is executed, a second value, for each loop nest, indicating a second rate by which a count of reading of the one or more cache lines is reduced; comparing the first value and the second value for each loop nest; converting a loop nest that has the first value larger than the second value and is included in the loop nests into the first conversion code; and converting a loop nest that has the second value larger than the first value and is included in the loop nests into the second conversion code.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates an example of a source code;
FIG. 5 illustrates an example of a conversion code generated from the source code;
FIG. 6 illustrates an example of the conversion code;
FIG. 7 illustrates an example of the conversion code.

DESCRIPTION OF EMBODIMENTS

Figure 1:
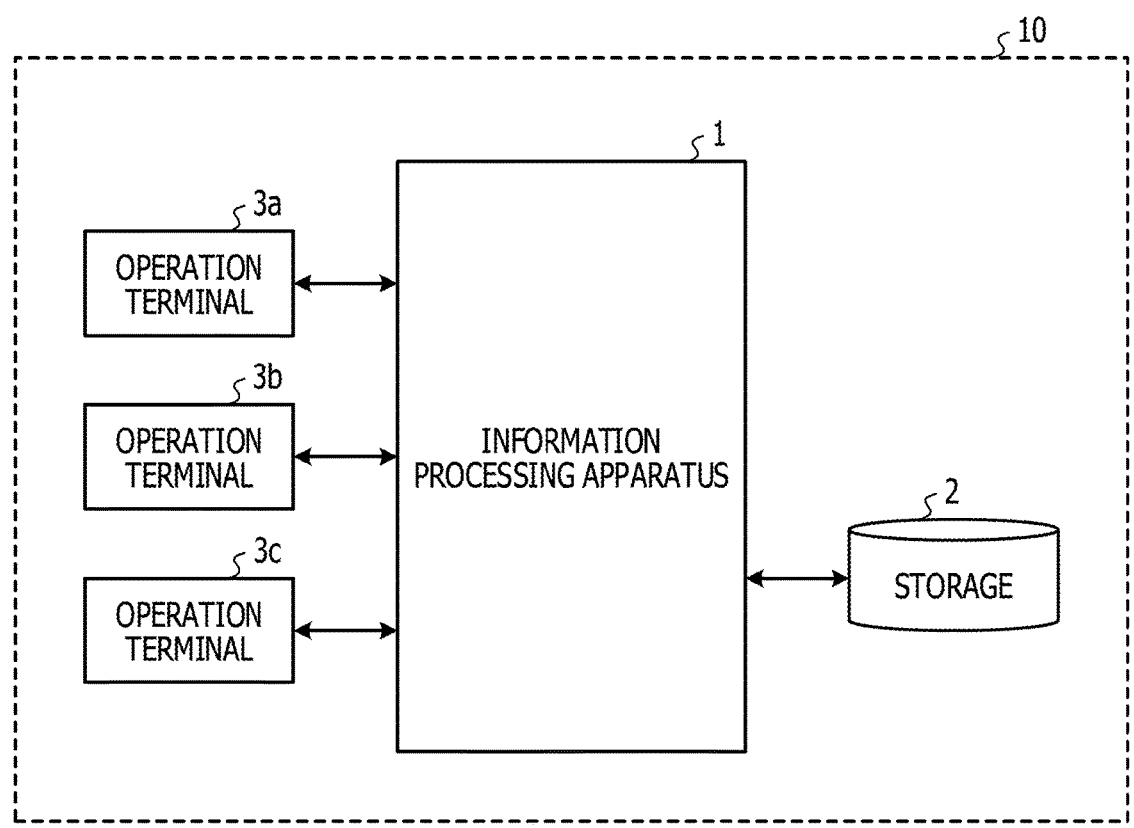
FIG. 1 illustrates an example of an information processing system.

For example, in a case where a value of a register is written in a main memory, the central processing unit (CPU) of the information processing apparatus judges whether a cache line including the address of a write target is present in the cache memory. If it is judged that a cache line including the address of a write target is not present in the cache memory, the CPU reads the cache line including the address of the write target from the main memory before performing a writing operation and arranges the read cache line in the cache memory. Thereafter, the CPU performs the writing operation for the cache line arranged in the cache memory.

The performance improvement of the CPU included in the computer involves a longer time taken to access the main memory than processing time taken in the CPU. In this case, the CPU thus waits for a long time until the CPU writes data, and it may not be possible to sufficiently exert the performance of the CPU itself.

For example, if the cache line including the address of the write target is present in the cache memory in advance, for example, if a cache hit occurs, the CPU immediately starts the writing operation for the cache line including the address of the write target. Accordingly, for example, before the CPU performs the writing operation, the cache line including the address of the write target may be read from the main memory and arranged in the cache memory in advance.

For example, in a case where all of data pieces in the cache line are overwritten such as in an operation of writing serial array elements, the cache line does not have to be transferred from the main memory to the cache memory. For example, since the bandwidth between the main memory and the cache memory is narrow, it is desirable that the CPU not transfer the cache line.

For example, the information processing apparatus has a function of reducing demanded memory throughput by using a cache-line fill instruction (hereinafter, also referred to as an XFILL instruction). The XFILL instruction is an instruction for performing an operation for filling an area reserved in the cache memory with an undefined value instead of reading the cache line from the main memory. The use of the instruction enables the CPU to reserve the cache line in the cache memory at the time of a data write operation without reading the cache line from the main memory to the cache memory. For example, the CPU executes a data write instruction for the cache line thus reserved and thereby starts the writing operation for the cache line in the same manner as in a cache hit, instead of waiting for a long time. Accordingly, the CPU has reduced processing time taken to perform the writing operation for the cache line. Since the transfer of the cache line from the main memory to the cache memory does not occur, decreasing the demanded memory throughput may lead to improvement of the performance of the CPU.

For example, it takes an XFILL instruction certain latency to reserve the cache line in the cache memory. The CPU thus regards a cache line several lines after the currently accessed cache line as the target of the XFILL instruction. Accordingly, the CPU may insufficiently obtain effects of the XFILL instruction execution depending on the iteration count of a loop including the XFILL instruction.

For example, a compiler, an information processing apparatus, or the like that enables performance improvement caused by the XFILL instruction execution may be provided.

FIG. 1 illustrates an example of an information processing system. An information processing system 10 illustrated in FIG. 1 includes an information processing apparatus 1, a storage 2, and operation terminals 3. The operation terminals 3 illustrated in FIG. 1 include operation terminals 3a, 3b, and 3c.

When time to start compiling (hereinafter, also referred to as compiling start time) comes, the information processing apparatus 1 (the CPU of the information processing apparatus 1) acquires a source code 134 stored, for example, in the storage 2, performs processing for compiling the acquired source code 134 (hereinafter, also referred to as a compiling process), and thereby generates at least one object code. The compiling start time may be, for example, time when an instruction indicating that compiling is to be performed is received from any of the operation terminals 3.

When time to execute the object code (hereinafter, also referred to as code execution time) comes, the information processing apparatus 1 performs processing for executing the object code generated in the compiling process (hereinafter, also referred to as a code execution process).

Figure 2:
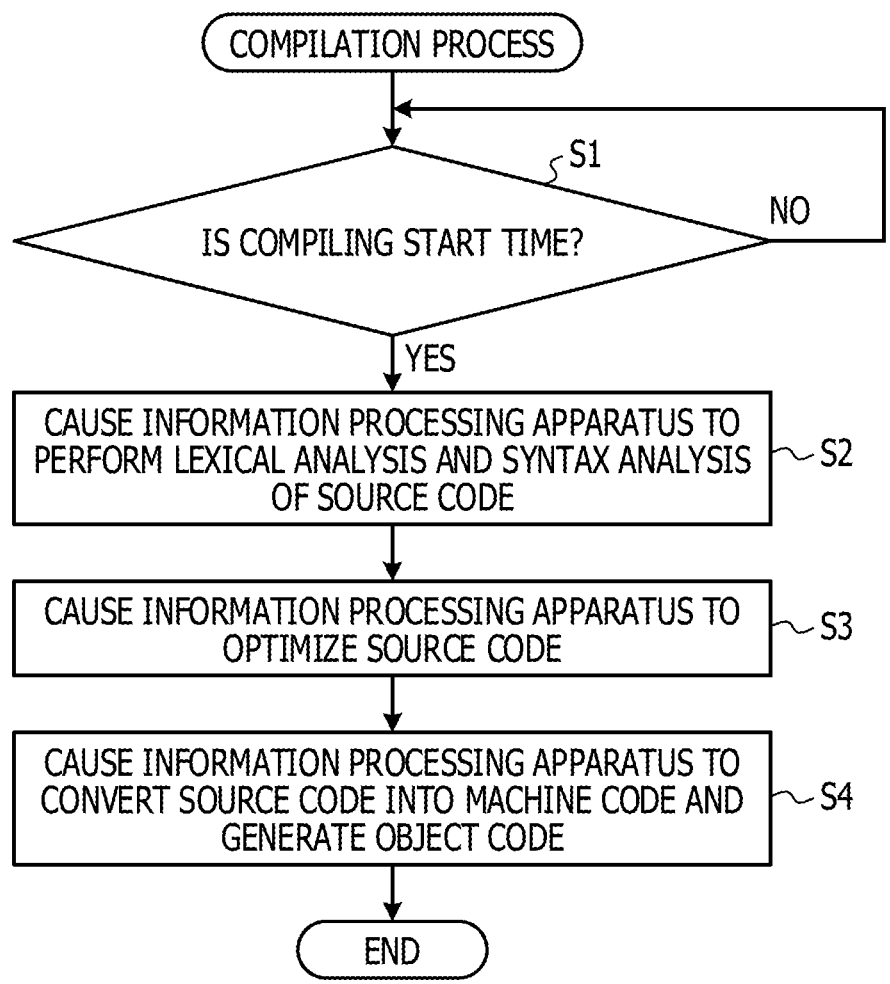
FIG. 2 illustrates an example of a compiling process executed by an information processing apparatus.

FIG. 2 is an example of the compiling process by an information processing apparatus.

The information processing apparatus 1 waits until the compiling start time as illustrated in FIG. 2 (NO in S1). If the compiling start time comes (YES in S1), the information processing apparatus 1 performs a lexical analysis and a syntax analysis of the source code 134 (S2). The information processing apparatus 1 converts, for example, the content of the source code 134 into an expression on a per-loop basis.

The information processing apparatus 1 optimizes the source code 134 based on the analysis results in the processing in S2 (S3). For example, the information processing apparatus 1 performs changing or the like of the form of a loop included in the source code 134 and generates at least one code resulting from the conversion of the source code 134 (hereinafter, also referred to as a conversion code). The information processing apparatus 1 converts the source code 134 optimized in the processing in S3 (conversion code) into machine code and thereby generates at least one object code (S4). The information processing apparatus 1 stores the generated object code, for example, in the storage 2.

The information processing apparatus 1 thereby optimizes the performance at the time of object code execution.

Figure 3:
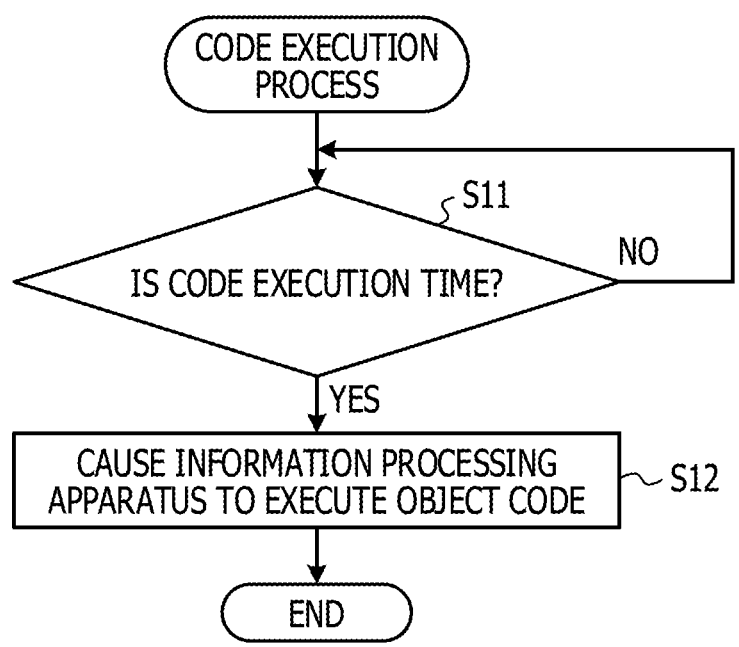
FIG. 3 illustrates an example of a code execution process executed by the information processing apparatus.

FIG. 3 illustrates an example of the code execution process by the information processing apparatus.

The information processing apparatus 1 waits until the code execution time as illustrated in FIG. 3 (NO in S11). If the code execution time comes (YES in S11), the information processing apparatus 1 executes the object code generated in the compiling process (S12). The information processing apparatus 1 acquires and executes the object code (object code generated in the compiling process) stored, for example, in the storage 2.

FIG. 4 illustrates an example of a source code. The source code 134 illustrated in FIG. 4 is a program described in Fortran.

Hereinafter, the object code generated from the source code 134 may be executed by, for example, the K computer that is a super computer manufactured by Fujitsu Limited, PRIMEHPC FX10 or FX100 (hereinafter, also simply referred to as a super computer). The cache line size may be 128 bytes, and 16 elements of a double-precision type array a may be arranged on one cache line. For example, the starting address of the array a may be aligned at the boundary with the 128th byte, and a cache line four lines (64 iterations) after the currently accessed cache line may be the target of the XFILL instruction. Note that n may be a multiple of 16 and may be a number greater than or equal to 64.

For example, the source code 134 illustrated in FIG. 4 describes processing for setting values serially in each of the array a(i, j) and an array b(i, j).

FIG. 5 illustrates an example of a conversion code generated from the source code.

The conversion code illustrated in FIG. 5 describes an XFILL instruction to reduce, for a data writing operation, the frequency at which a reading operation for a cache line from the main memory to the cache memory is performed. For example, XFILL (a(i+64, j)) in the conversion code illustrated in FIG. 5 leads to processing in which a cache line including the address of an array a(i+64, j) is reserved in the cache memory by executing an XFILL instruction for the cache line including the address of the array a(i+64, j).

For example, in the conversion code illustrated in FIG. 5, 16 unrolling steps are performed to execute the XFILL instruction only one time per line.

For example, in the conversion code illustrated in FIG. 5, a loop included in the source code 134 described with reference to FIG. 4 is divided into a loop corresponding to iteration with i from 1 to n−64 and a loop corresponding to iteration with i from n−64+1 to n. For example, as illustrated in FIG. 5, if the number of elements in the first dimension of the array a is n+p (p is larger than 0 and is a multiple of 16), the CPU may thereby hinder data in an area of the array a (n+i) (i>0) from being destroyed due to the execution of the XFILL instruction. Also in a case where, for example, the number of elements in the first dimension of the array a is n, the CPU may hinder data in a next area of the array a (for example, an area in a different array) from being destroyed due to the execution of the XFILL instruction.

For example, assume that n is 384 in the conversion code illustrated in FIG. 5. In the processing with i from 1 to 64, the array a has to be read once from the cache memory. However, in the processing with i from 65 to 384, reservation of a cache line including the address of the array a in the cache memory is performed accompanying execution of the XFILL instruction, and thus reading the cache line from the main memory is omitted. For example, in this case, the percentage of omitting the reading of a cache line from the main memory is about 83%. Accordingly, if an object code generated from the conversion code described with reference to FIG. 5 is executed, the CPU may have largely reduced processing time.

For example, if n is 64 in the conversion code illustrated in FIG. 5, the CPU reads all of cache lines including the respective addresses for the array a and stores the cache lines in the main memory. In this case, the CPU thus may fail to obtain the effects to be otherwise obtained by executing the XFILL instruction.

For example, as the data path width of a single instruction multiple data (SIMD) instruction in which a plurality of pieces of data are processible with one instruction has been increased in the super computer, a cache line size has been increased to 256 bytes that is two times larger than before. Accordingly, even a relatively large iteration count, for example, about several hundred leads to a situation in which the CPU insufficiently obtain the effects to be exerted by executing the XFILL instruction.

FIG. 6 illustrates an example of the conversion code. For example, a conversion code generated when the cache line size is 256 bytes is illustrated. For example, the cache line size may be 256 bytes, and 32 elements of a double-precision type array a may be arranged on one cache line. For example, the starting address of the array a may be aligned at the boundary with the 256th byte, and a cache line six lines (96 iterations) after the currently accessed cache line may be the target of the XFILL instruction.

Assume that n is 384 in the conversion code illustrated in FIG. 6. In processing with i from 193 to 384, reservation of a cache line including the address of the array a in the cache memory is performed accompanying execution of the XFILL instruction. In processing with i from 1 to 192, a cache line including the address of the array a is read once from the main memory. Accordingly, in this case, cache lines that account for 50% of the array a are read from the main memory, and thus the effects to be exerted by executing the XFILL instruction may be reduced.

The information processing apparatus 1 thus generates an XFILL instruction for iteration of, for example, a loop that is one loop outward of the innermost loop (hereinafter, also referred to as an outer loop).

FIG. 7 illustrates an example of the conversion code. FIG. 7 illustrates an example of a conversion code having an XFILL instruction generated for the iteration of an outer loop.

As illustrated in FIG. 7, if the iteration count of the innermost loop is 192 (corresponding to six lines), cache lines including the respective addresses of the array a to be written in iteration after j+1 are reserved in the cache memory. For example, when j is 2, operations of reading cache lines corresponding to 50% of the array a may be reduced in the CPU. For example, if the value of j is larger, the CPU may have a larger percentage of reduction of the operation of reading the cache lines from the main memory.

For example, even if the iteration count of the innermost loop is a small value such as 96, six lines are reserved by increasing the iteration of j as the XFILL target from j+1 to j+3. Accordingly, in this case, the CPU may hide the latency of the XFILL instruction.

For example, there is also a case where the execution of the object code generated from the conversion code described with reference to FIG. 6 enables the processing performance to be improved more than the execution of the object code generated from the conversion code described with reference to FIG. 7, such as a case where the iteration count of the innermost loop is relatively large. Accordingly, the object code generated from the conversion code described with reference to FIG. 6 and the object code generated from the conversion code described with reference to FIG. 7 may be used differently depending on the content of processing such as a loop described in the source code 134.

For example, for each of loop nests included in the source code 134, the information processing apparatus 1 (the CPU of the information processing apparatus 1) calculates a value (hereinafter, also referred to as a first value) indicating a percentage by which the number of times a cache line is read from the main memory is reduced if a conversion code (hereinafter, also referred to as a first conversion code) is executed, the conversion code including the XFILL instruction for identifying a cache line as an XFILL instruction target based on the current iteration count (repetition count) of the innermost loop of the loop nests included in the source code 134.

For example, the CPU calculates, as the first value, a percentage by which the number of times a cache line is read from the main memory is reduced if the first conversion code is executed, the first conversion code resulting from the conversion of the loop nest included in the source code 134 by the conversion method described with reference to FIG. 6.

For each loop nest included in the source code 134, the CPU calculates a value (hereinafter, also referred to as a second value) indicating a percentage by which the number of times a cache line is read from the main memory is reduced if a conversion code (hereinafter, also referred to as a second conversion code) is executed, the conversion code including the XFILL instruction for identifying a cache line as an XFILL instruction target based on the current iteration count of the outer loop of the innermost loop of the loop nests included in the source code 134.

For example, the CPU calculates, as the second value, the percentage by which the number of times a cache line is read from the main memory is reduced if the second conversion code is executed, the second conversion code resulting from the conversion of the loop nest included in the source code 134 by the conversion method described with reference to FIG. 7.

The CPU compares the first value and the second value for each loop nest included in the source code 134. The CPU converts a loop nest having the first value larger than the second value among the loop nests included in the source code 134 into a first conversion code and converts a loop nest having the second value larger than the first value among the loop nests included in the source code into the second conversion code.

The CPU may thereby select a conversion method for each loop nest included in the source code 134 based on the iteration count of the loop nest. The CPU may thus reduce the frequency of reading a cache line from the main memory regardless of the iteration count of the loop nest included in the source code 134. Accordingly, the CPU may reduce processing time taken to perform a writing operation for the cache line. The CPU may also improve the performance due to the lowering of the demanded memory throughput.

Figure 8:
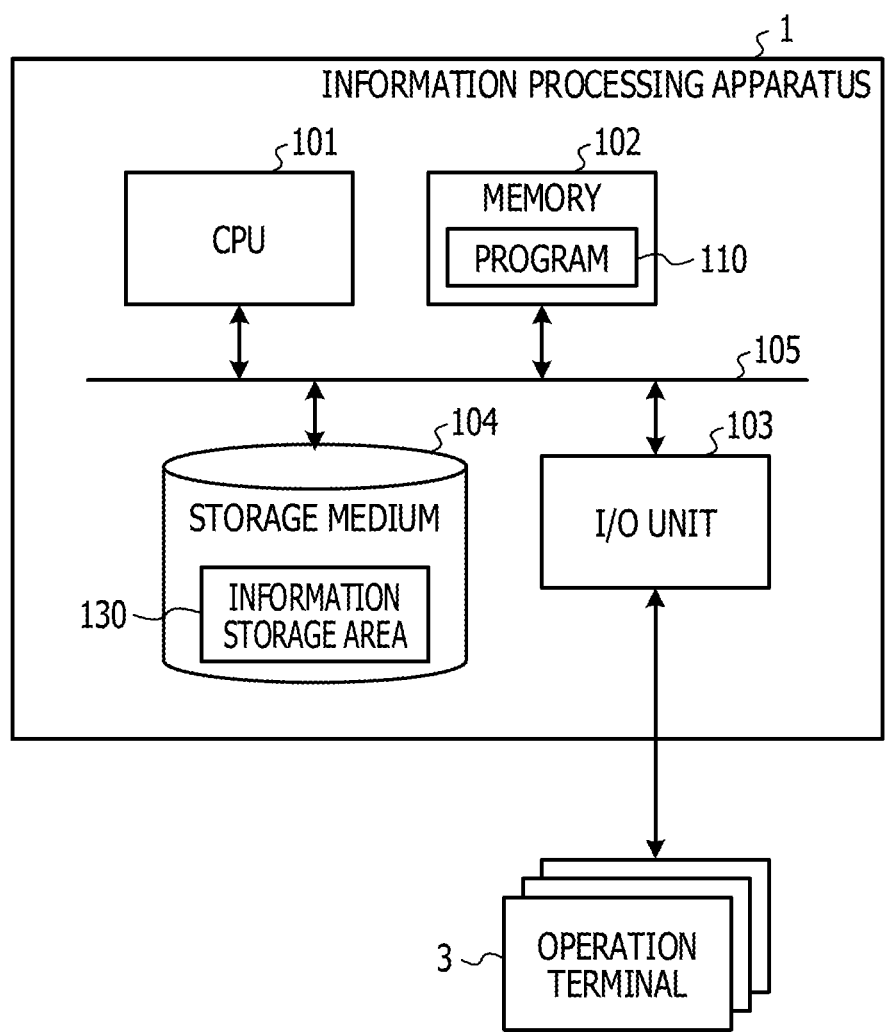
FIG. 8 illustrates an example of the hardware configuration of the information processing apparatus.

FIG. 8 illustrates an example of the hardware configuration of the information processing apparatus.

As illustrated in FIG. 8, the information processing apparatus 1 includes a CPU 101 that is a processor, a main memory 102 (hereinafter, also simply referred to as a memory 102), an external interface (I/O unit) 103, and a storage medium (storage) 104. The components are connected to each other via a bus 105.

The storage medium 104 stores a program 110 for executing the compiling process and the code execution process in a program storage area (not illustrated) in the storage medium 104.

As illustrated in FIG. 8, to run the program 110, the CPU 101 loads the program 110 from the storage medium 104 on the memory 102 and executes the compiling process in cooperation with the program 110.

The storage medium 104 is, for example, a hard disk drive (HDD), a solid state drive (SSD), or the like and has an information storage area 130 (hereinafter, also referred to as a storage unit 130) that stores information used when the compiling process or the like is executed.

The external interface 103 communicates with the operation terminals 3 via a network.

Figure 9:
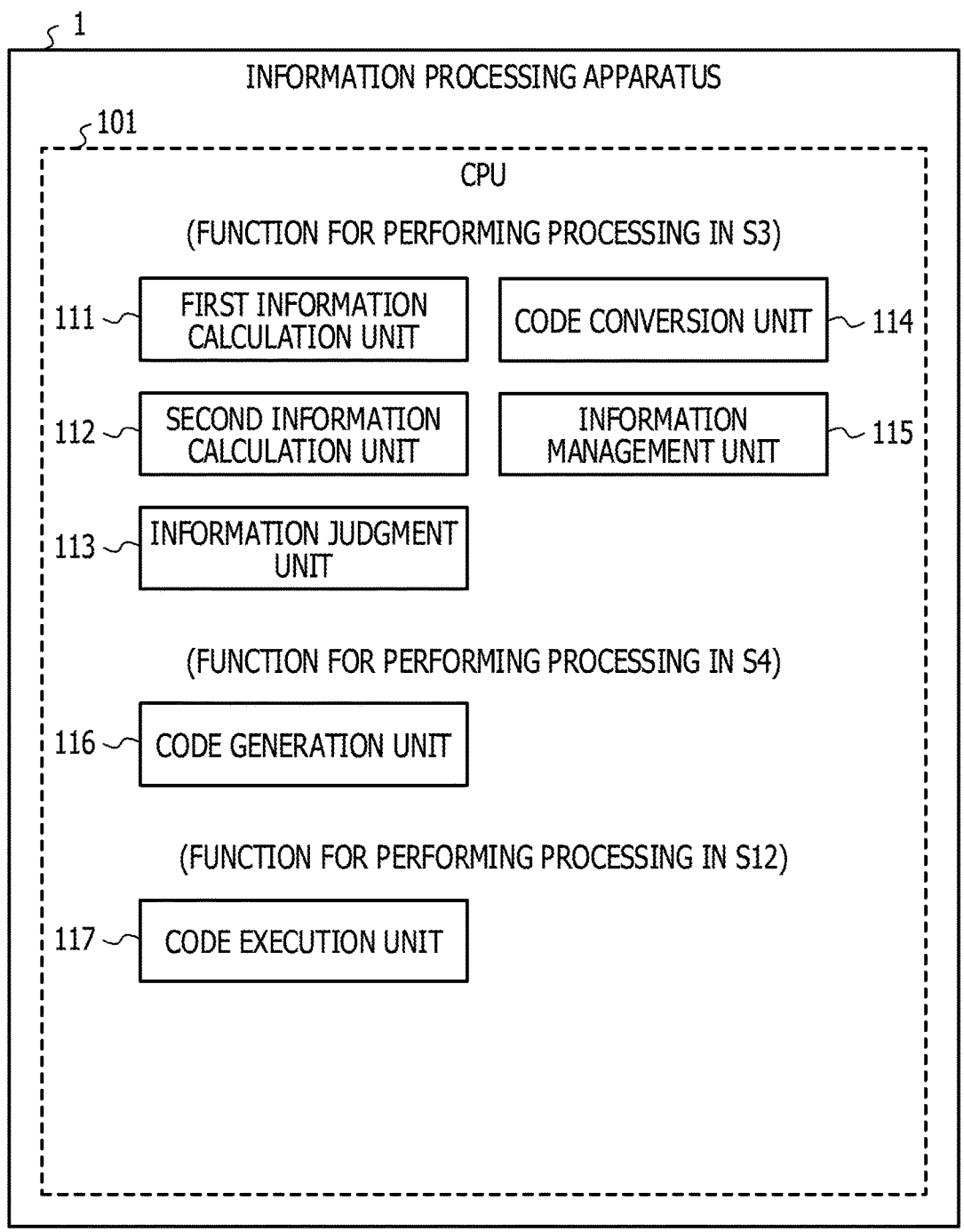
FIG. 9 illustrates an example of functional blocks of the information processing apparatus.
Figure 10:
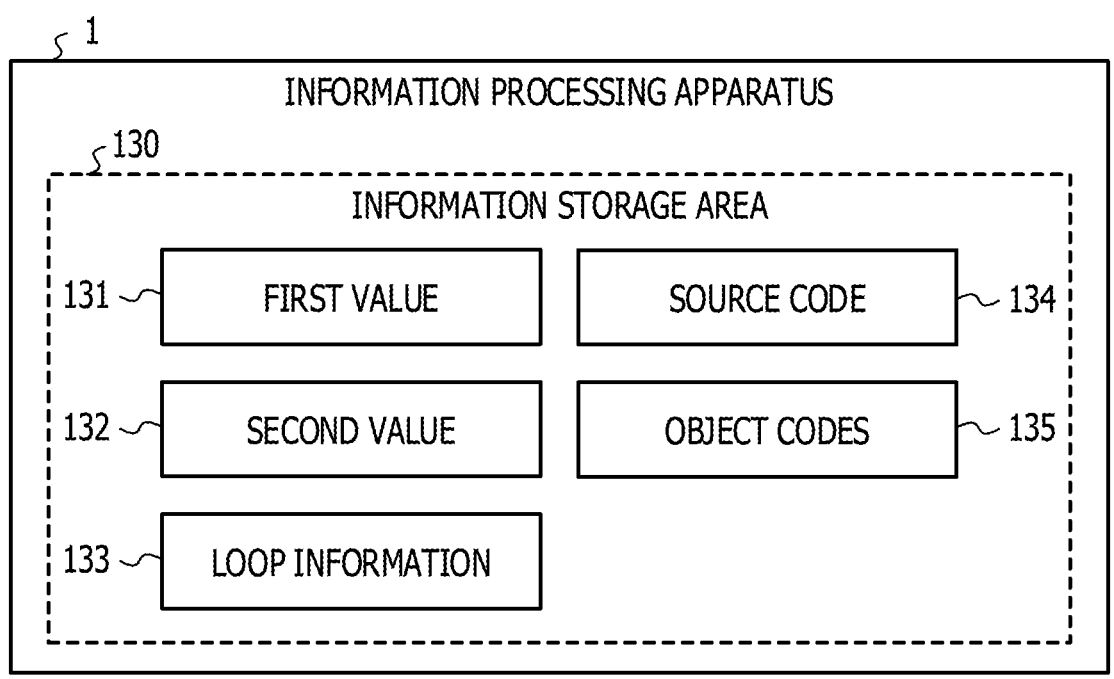
FIG. 10 illustrates an example of information stored in an information storage area.

FIG. 9 illustrates an example of the functional blocks of the information processing apparatus. FIG. 10 illustrates an example of information stored in the information storage area.

As illustrated in FIG. 9, in cooperation with the program 110, the CPU 101 functions as a first information calculation unit 111, a second information calculation unit 112, an information judgment unit 113, a code conversion unit 114, an information management unit 115, a code generation unit 116, and a code execution unit 117. As illustrated in FIG. 10, the information storage area 130 stores at least one first value 131, at least one second value 132, loop information 133, the source code 134, and object codes 135.

Hereinafter, description is provided on the assumption that the first information calculation unit 111, the second information calculation unit 112, the information judgment unit 113, the code conversion unit 114, and the information management unit 115 perform at least part of the processing in S3 described with reference to FIG. 2. Description is provided on the assumption that the code generation unit 116 performs at least part of the processing in S4 described with reference to FIG. 2. Description is provided on the assumption that the code execution unit 117 performs at least part of the processing in S12 described with reference to FIG. 3.

The first information calculation unit 111 calculates, for each loop nest included in the source code 134, the first value 131 indicating a percentage by which the number of times a cache line is read from the main memory is reduced if a conversion code (hereinafter, also referred to as a first conversion code 134*a*) is executed, the conversion code including an XFILL instruction for identifying a cache line as an XFILL instruction target based on the current iteration count of the innermost loop of the loop nests included in the source code 134.

The second information calculation unit 112 calculates, for each loop nest included in the source code 134, the second value 132 indicating a percentage by which the number of times a cache line is read from the main memory is reduced if a conversion code (hereinafter, also referred to as a second conversion code 134*b*) is executed, the conversion code including the XFILL instruction for identifying a cache line as an XFILL instruction target based on the current iteration count of the outer loop of the innermost loop in the loop nests included in the source code 134. The outer loop of the innermost loop is, for example, a loop one loop outward of the innermost loop.

For each loop nest included in the source code 134, the information judgment unit 113 compares the first value 131 calculated by the first information calculation unit 111 and the second value 132 calculated by the second information calculation unit 112. The information judgment unit 113 also judges whether the first value 131 and the second value 132 are less than respective predetermined thresholds for each loop nest included in the source code 134.

Among the loop nests included in the source code 134, the code conversion unit 114 converts loop nests each judged to have the first value 131 larger than the second value 132 by the information judgment unit 113 and thereby generates the first conversion code 134*a* for each loop nest judged to have the first value 131 larger than the second value 132. Among the loop nests included in the source code 134, the code conversion unit 114 converts loop nests each judged to have the second value 132 larger than the first value 131 by the information judgment unit 113 and thereby generates the second conversion code 134*b* for each loop nest judged to have the second value 132 larger than the first value 131. Among the loop nests included in the source code 134, the code conversion unit 114 does not convert loop nests judged to have the first value 131 and the second value 132 less than the respective predetermined thresholds by the information judgment unit 113.

If at least one loop nest for which all of pieces of information for calculating the first value 131 or the second value 132 are not acquirable at the time of compiling (translating) the source code 134 is present in the loop nests included in the source code 134, the code conversion unit 114 generates, for each of the loop nests present, the first conversion code 134*a*, the second conversion code 134*b*, and a code including instructions for calculating the first value 131 and the second value 132 (hereinafter, also referred to as an information calculation code 134*c*).

The information management unit 115 performs reading or the like of various pieces of information stored, for example, in the information storage area 130.

If at least one first conversion code 134*a* has been generated, the code generation unit 116 generates an object code (hereinafter, also referred to as a first object code 135*a*) from each of the generated first conversion codes 134*a*. In addition, if at least one second conversion code 134*b* has been generated, the code generation unit 116 generates an object code (hereinafter, also referred to as a second object code 135*b*) from each of the generated second conversion code 134*b*. The code generation unit 116 generates an object code (hereinafter, also referred to as a third object code 135*c*) from each of loop nests to be used among the loop nests included in the source code 134. If at least one information calculation code 134*c* has been generated, the code generation unit 116 generates an object code 135 (hereinafter, also referred to as a fourth object code 135*d*) from each of the generated information calculation codes 134*c*. The code generation unit 116 stores the generated object codes 135, for example, in the information storage area 130.

For example, if the code execution time comes, the code execution unit 117 executes the object codes 135 stored in the information storage area 130.

Figure 11:
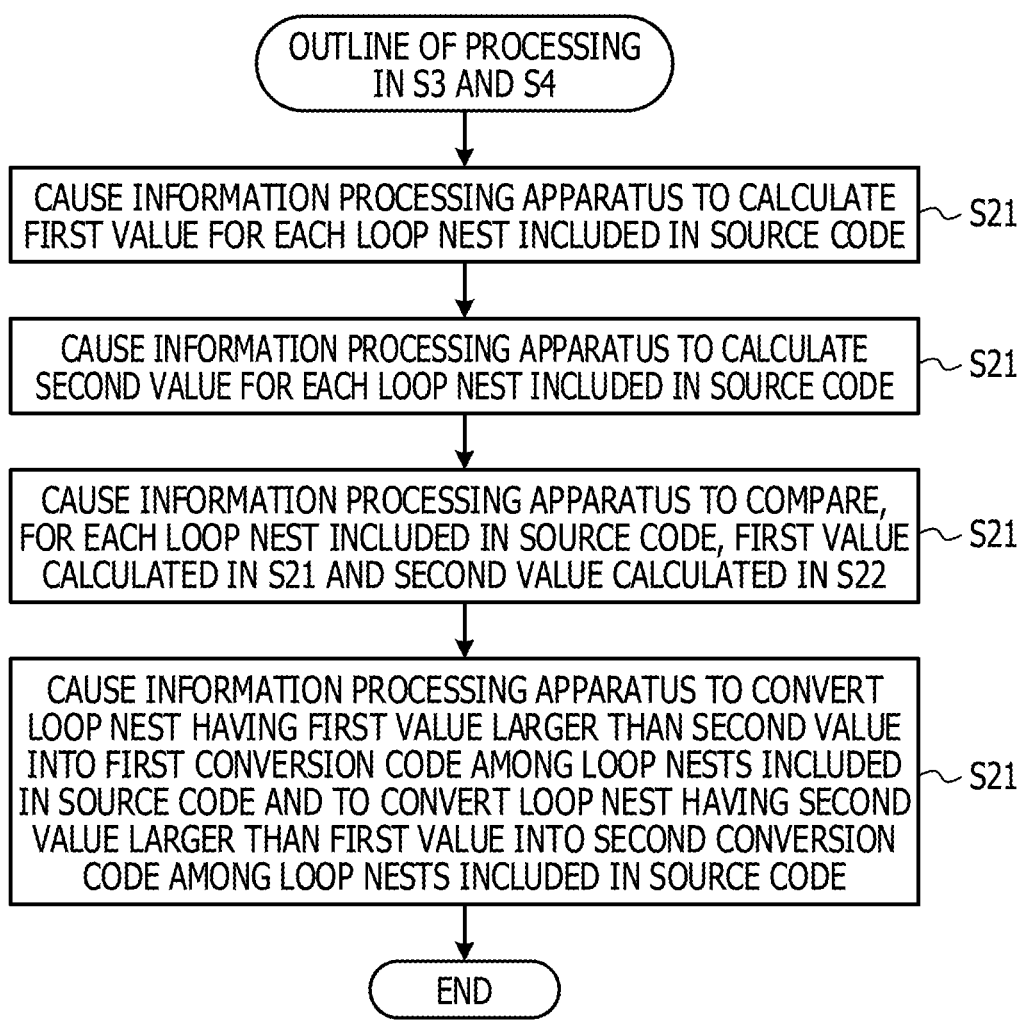
FIG. 11 illustrates an example of processing in S3 and S4.

FIG. 11 illustrates an example of the processing in S3 and S4. S3 and S4 illustrated in FIG. 11 may correspond to S3 and S4 illustrated in FIG. 2.

The CPU 101 of the information processing apparatus 1 calculates, for each loop nest included in the source code 134, the first value 131 for the case where the first conversion code 134a is executed, the first conversion code 134a including a second instruction (XFILL instruction) for identifying a target area (target area for the XFILL instruction) based on the iteration count of a first instruction (an instruction included in the current innermost loop) based on the innermost loop (S21).

The CPU 101 calculates, for each loop nest included in the source code 134, the second value 132 for the case where the second conversion code 134b is executed, the second conversion code 134b including the second instruction for identifying the target area based on the current iteration count of the first instruction included in the outer loop of the innermost loop (S22).

For each loop nest included in the source code 134, the information processing apparatus 1 judges whether the first value 131 calculated in the processing in S11 is larger than the second value 132 calculated in the processing in S12 (S23).

The CPU 101 converts, into the first conversion code 134a, each loop nest having the first value 131 larger than the second value 132 among the loop nests included in the source code 134 and converts, into the second conversion code 134b, each loop nest having the second value 132 larger than the first value 131 among the loop nests included in the source code 134 (S24).

The CPU may thereby select a conversion method for each loop nest included in the source code 134 based on the iteration count of the loop nest. The CPU may thus reduce the frequency of reading a cache line from the main memory 102 regardless of the iteration count of the loop nest included in the source code 134. Accordingly, the CPU may reduce processing time taken to perform a writing operation for the cache line. The CPU may also improve the performance due to the lowering of the demanded memory throughput.

FIGS. 12 to 15 illustrate an example of the compiling process and the code execution process.

Figure 12:
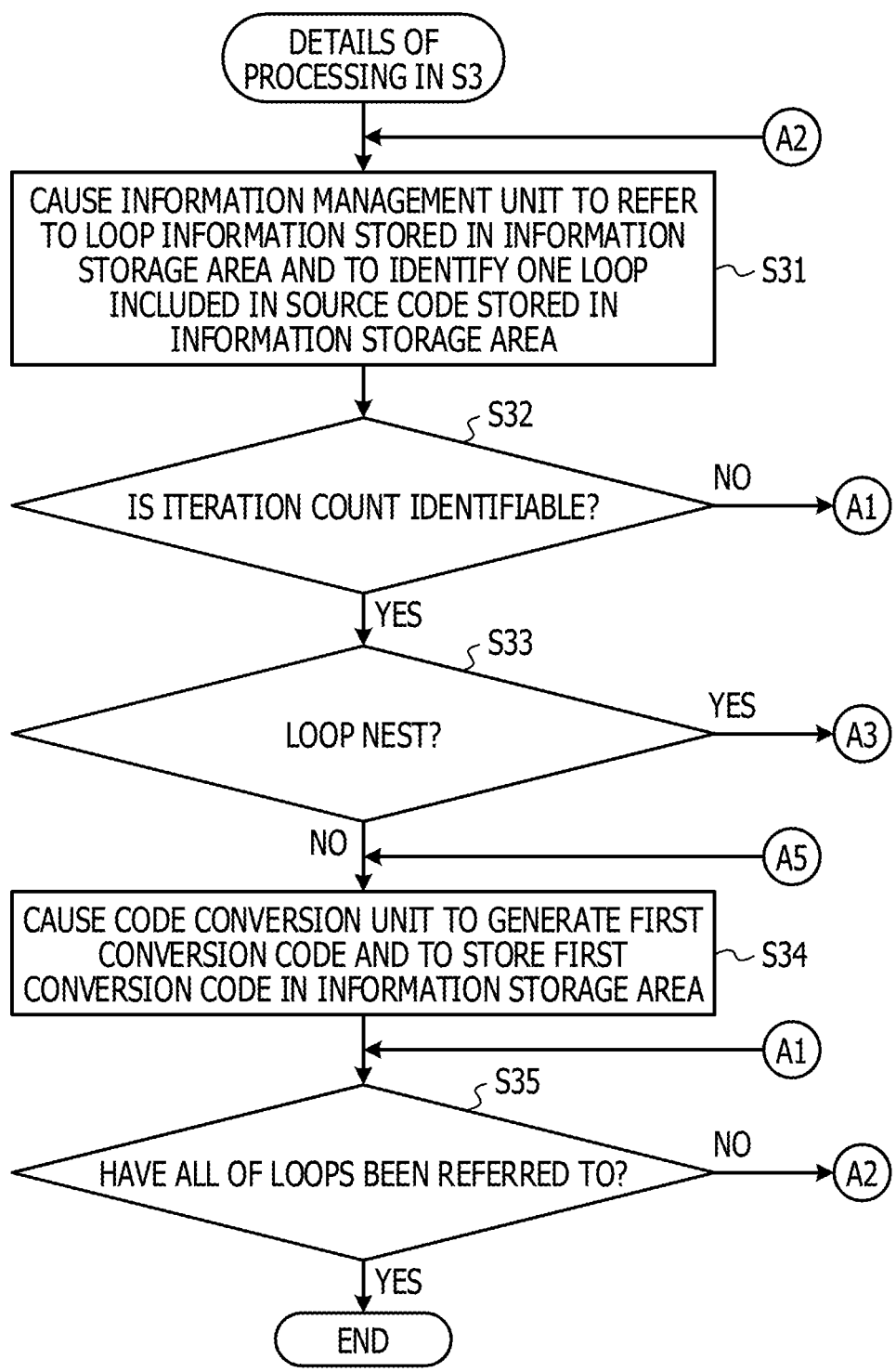
FIG. 12 illustrates an example of the compiling process and the code execution process.
Figure 13:
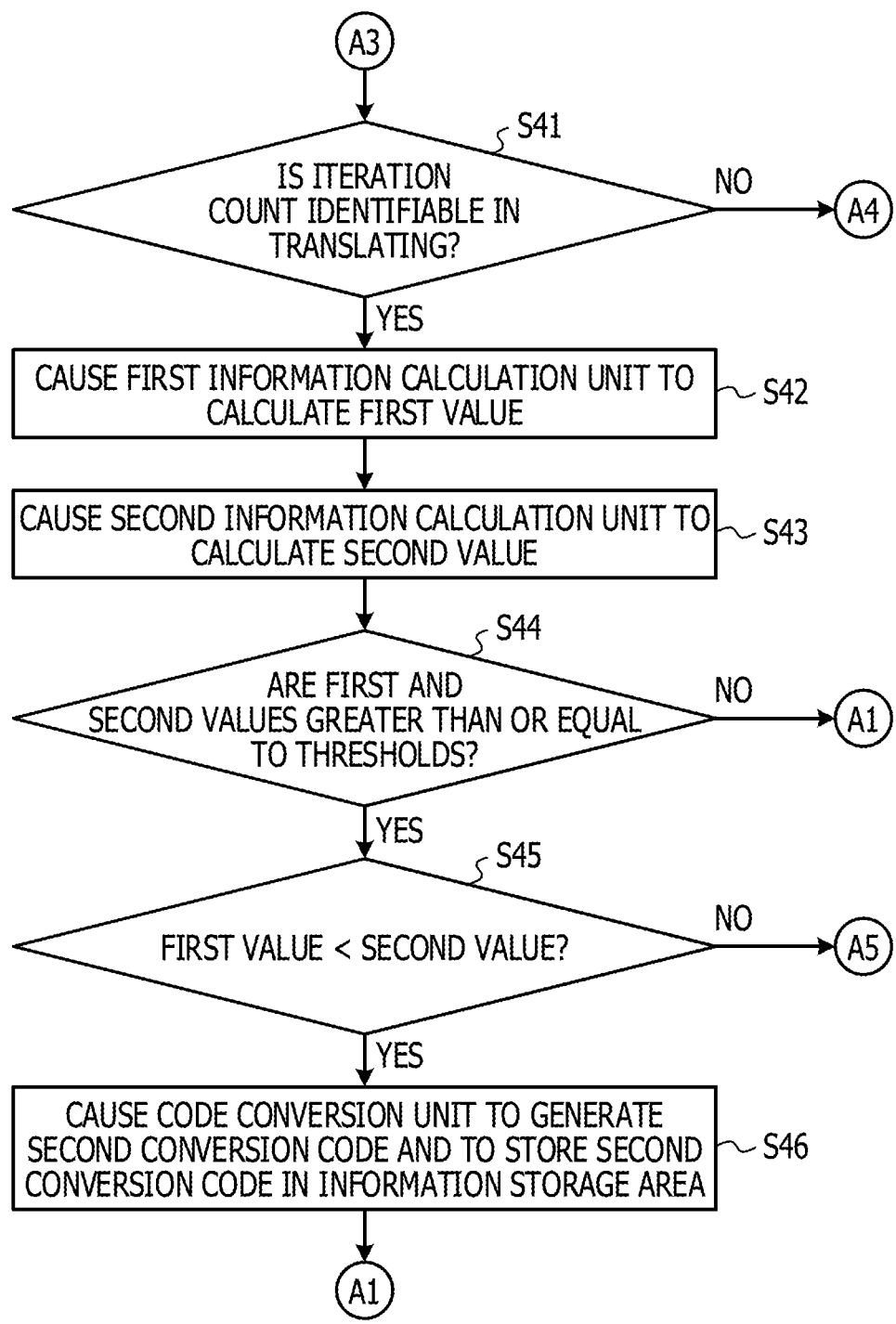
FIG. 13 illustrates the example of the compiling process and the code execution process.
Figure 14:
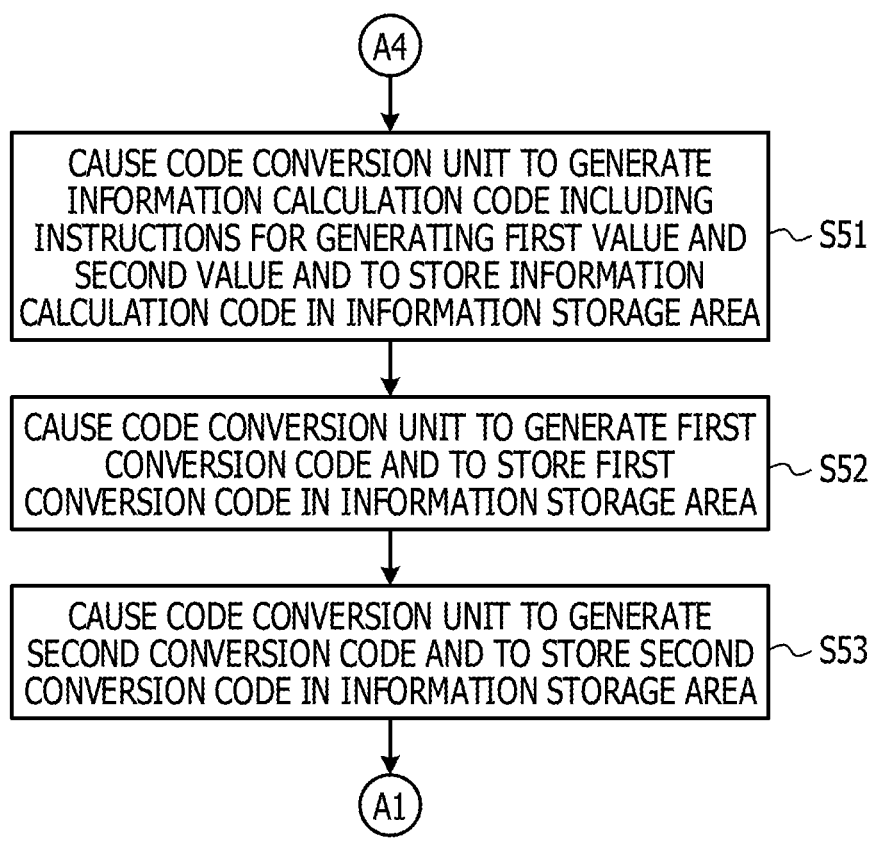
FIG. 14 illustrates the example of the compiling process and the code execution process.

FIGS. 12 to 14 illustrate the processing in S3 illustrated in FIG. 2.

As illustrated in FIG. 12, the information management unit 115 of the information processing apparatus 1 refers to the loop information 133 stored in the information storage area 130 and identifies a loop included in the source code 134 (S31). The loop information 133 is information regarding the loops included in the source code 134. Note that the loop information 133 may be, for example, automatically generated from the source code 134 and then stored in the information storage area 130.

The information management unit 115 judges whether the iteration count of the loop identified in the processing in S31 is identifiable (S32). For example, if the iteration count of the loop identified in the processing in S31 is a fixed number, the information management unit 115 may judge that the iteration count of the loop identified in the processing in S31 is identifiable.

As a result, if it is judged that the iteration count of the loop is not identifiable (NO in S32), the information management unit 115 judges whether every loop included in the loop information 133 has been identified (S35). If it is judged that every loop included in the loop information 133 has been identified (YES in S35), the information processing apparatus 1 terminates the processing in S3.

In contrast, if it is judged that every loop included in the loop information 133 has not been identified yet (NO in S35), the information management unit 115 again performs processing in and subsequent to S31. For example, if the loop identified in the processing in S31 is not a loop the iteration count of which is not identifiable, the code conversion unit 114 judges that the form of the loop identified in the processing in S31 is not to be changed.

If the iteration count of the loop is identifiable in the processing in S32 (YES in S32), the information management unit 115 judges whether the loop identified in the processing in S31 is a loop nest (S33).

If it is judged that the loop identified in the processing in S31 is a loop (single loop) that is not a loop nest (NO in S33), the code conversion unit 114 generates the first conversion code 134a from the loop nest identified in the processing in S31 and stores the first conversion code 134a in the information storage area 130 (S34). Specifically, the code conversion unit 114 generates the XFILL instruction and divides the loop nest in accordance with, for example, the conversion method described with reference to FIG. 6.

If the loop identified in the processing in S31 is a loop nest (YES in S33), the code conversion unit 114 judges whether the loop identified in the processing in S31 is a loop the iteration count of which is identifiable at the time of compiling, as illustrated in FIG. 13 (S41). For example, if the determination of the iteration count of the loop identified in the processing in S31 is performed accompanying execution of a different instruction included in the source code 134, the code conversion unit 114 may judge that the loop identified in the processing in S31 is a loop the iteration count of which is not identifiable at the time of compiling.

As a result, if it is judged that the loop identified in the processing in S31 is a loop the iteration count of which is identifiable at the time of compiling (YES in S41), the first information calculation unit 111 calculates the first value 131 (S42).

The first information calculation unit 111 calculates the first value 131 in the processing in S42, for example, by using Formula (1) below. In Formula (1), h denotes an iteration count to be used for hiding the latency involved with the execution of the XFILL instruction, and n denotes the iteration count of the innermost loop.

$$\text{First value}=(n-h>0)?(n-h)/n:0 \qquad (1)$$

For example, in a case where n is 96 and h is 192, the first information calculation unit 111 obtains 0 as the first value 131.

Referring back to FIG. 13, the second information calculation unit 112 calculates the second value 132 (S43).

The second information calculation unit 112 calculates the second value 132 in the processing in S43, for example, by using Formula (2) below. In Formula (2), h denotes an iteration count to be used for hiding the latency involved with the execution of the XFILL instruction, n denotes the iteration count of the innermost loop, m denotes the iteration count of the outer loop, and ceil(x) is a function for calculating the smallest integer greater than or equal to x.

$$\text{Second value}=(m-\text{ceil}(h/n))/m \qquad (2)$$

For example, in a case where n is 96, m is 96, and h is 192, the second information calculation unit 112 obtains 0.969 (three significant figures after the decimal point) as the second value 132.

Referring back to FIG. 13, the information judgment unit 113 judges whether the first value 131 calculated in the processing in S42 and the second value 132 calculated in the processing in S43 are greater than or equal to the respective predetermined thresholds (S44).

As a result, if it is judged that the first value 131 calculated in the processing in S42 and the second value 132 calculated in the processing in S43 are not greater than or equal to the respective predetermined thresholds (NO in S44), the information management unit 115 performs the processing in and subsequent to S35. That is, in this case, the code conversion unit 114 judges that changing the form of the loop is slightly effective and judges that the loop identified in the processing in S31 is not to be converted.

In contrast, if it is judged that the first value 131 calculated in the processing in S42 and the second value 132 calculated in the processing in S43 are greater than or equal to the respective predetermined thresholds (YES in S44), the information judgment unit 113 judges whether the second value 132 calculated in the processing in S43 exceeds the first value 131 calculated in the processing in S42 (S45).

If it is judged that the second value 132 calculated in the processing in S43 exceeds the first value 131 calculated in the processing in S42 (YES in S45), the code conversion unit 114 generates the second conversion code 134b from the loop nest identified in the processing in S31 and stores the second conversion code 134b in the information storage area 130 (S46). The code conversion unit 114 generates the XFILL instruction and divides the loop nest in accordance with, for example, the conversion method described with reference to FIG. 7. Thereafter, the information management unit 115 performs the processing in and subsequent to S35.

In contrast, if it is judged that the second value 132 calculated in the processing in S43 does not exceed the first value 131 calculated in the processing in S42 (NO in S45), the code conversion unit 114 performs the processing in and subsequent to S34.

For example, the code conversion unit 114 generates, for each loop nest included in the source code 134, one of the first conversion code 134a and the second conversion code 134b that is a conversion code expected to lead to more effective code conversion.

The code conversion unit 114 generates the XFILL instruction in processing in S46 by using, for example, Formulae (3) and (4) below. In Formulae (3) and (4), s denotes the size of a cache line, e denotes a value obtained by dividing s by the maximum value of the sizes in variable types included in the loop nest, i denotes the counter variable of the iteration count of the innermost loop, j denotes the counter variable of the iteration count of the outer loop, n denotes the iteration count of the innermost loop, m denotes the iteration count of the outer loop, a(i, j) denotes the address of the elements i and j of the array a, and D denotes a shift difference between s-byte alignment of the starting address of the array in the current iteration and s-byte alignment of the starting address of the array in the next iteration. Further, M denotes a shift from s-byte alignment of the starting address of the array.

$$D = (\mathrm{mod}(a(1,j+1),s) - \mathrm{mod}(a(1,j),s))/\text{maximum value of sizes in variable types included in loop nest} \quad (3)$$

$$M = \mathrm{mod}(a(1,1),s)/\text{maximum value of sizes in variable types included in loop nest} \quad (4)$$

In a case where D=0 and M=0, starting alignment is performed every s bytes. Accordingly, an address corresponding to j+1 is designated for an element with i=e*(k−1)+1, k=1, 2, . . . , n/e, and the XFILL instruction is executed.

In a case where D=0 and M!=0, the alignment is performed in the same way every time despite the starting alignment. Accordingly, an address corresponding to j+1 is designated for an element with i=(e−M)+e*(k−1)+1, k=1, 2, . . . , (n−M)/e, and the XFILL instruction is executed.

In a case where D!=0, the s-byte alignment is not ensured at the starting address. Accordingly, an address corresponding to j+1 is designated for an element with i=(e−M)+mod(D*(j−1), e)+e*(k−1)+1, k=1, 2, . . . , (n−M+mod(D*(m−1), e)−e)/e, and the XFILL instruction is executed.

For example, in a case where s=256, e=32, n=96, m=96, D=0, and M=0, the XFILL instruction is executed for a(i, j+1) with i=1, 33, 65 and j+1 as in the example described with reference to FIG. 7.

In a case where s=256, e=32, n=96, D=0, and M=16, the XFILL instruction is executed for a(i, j+1) with i=17, 49 and j+1.

In a case where s=256, e=32, n=96, D=3, and M=16, the XFILL instruction is executed for a(i, j+1) with i={17, 49}+mod(3(j−1), 32) and j+1.

Referring back to FIG. 13, if the loop identified in the processing in S31 is a loop the iteration count of which is not identifiable at the time of compiling (NO in S41), the code conversion unit 114 generates the information calculation code 134c including instructions for generating the first value 131 and the second value 132 and stores the information calculation code 134c in the information storage area 130 as illustrated in FIG. 14 (S51). The code conversion unit 114 also generates the first conversion code 134a and stores the first conversion code 134a in the information storage area 130 (S52). The code conversion unit 114 generates the second conversion code 134b and stores the second conversion code 134b in the information storage area 130 (S53).

In this case, the information processing apparatus 1 has to determine a conversion method for the source code 134 when the object code 135 is executed. Accordingly, the code conversion unit 114 generates each of the first conversion code 134a and the second conversion code 134b in advance. In addition, the code conversion unit 114 in advance generates the information calculation code 134c used to calculate the first value 131 and the second value 132.

The information processing apparatus 1 may thereby reduce the frequency of reading a cache line from the memory 102 even though the conversion method for the source code 134 is not determinable at the time of compiling.

Figure 15:
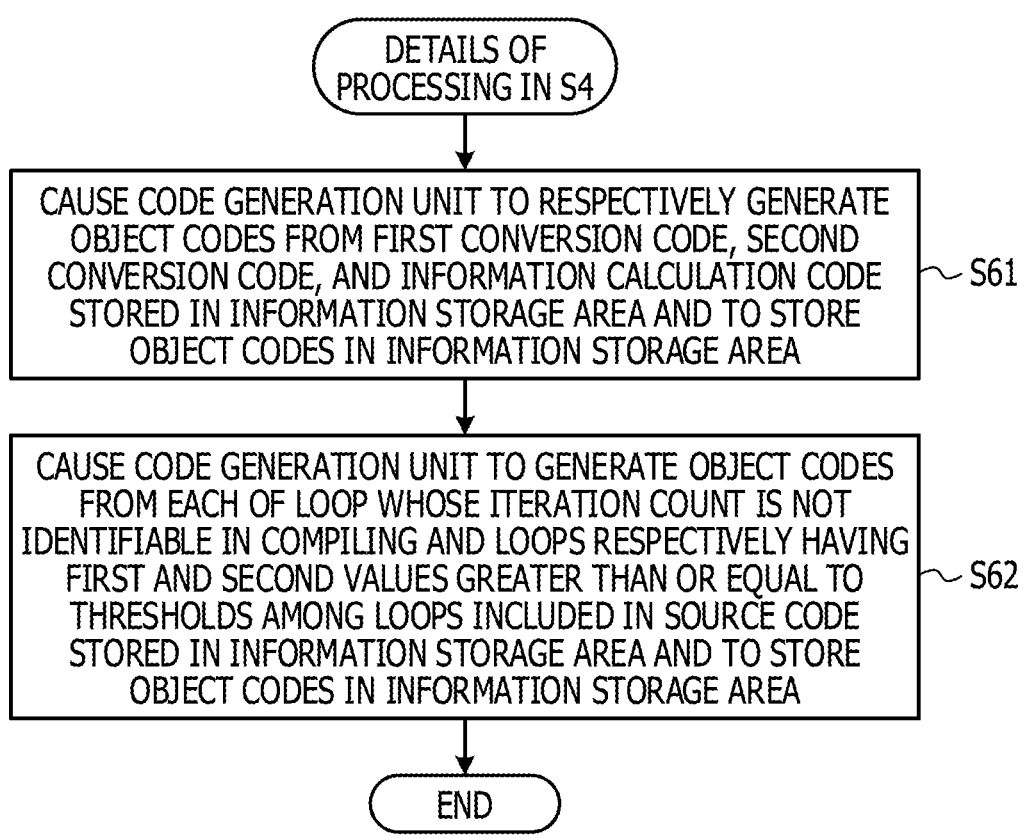
FIG. 15 illustrates an example of the compiling process and the code execution process.

FIG. 15 illustrates an example of the processing in S4 illustrated in FIG. 2.

As illustrated in FIG. 15, the code generation unit 116 generates the first object code 135a, the second object code 135b, and the fourth object code 135d, respectively, from the first conversion code 134a, the second conversion code 134b, and the information calculation code 134c that are stored in the information storage area 130 and stores the first object code 135a, the second object code 135b, and the fourth object code 135d in the information storage area 130 (S61).

Among the loops included in the source code 134 stored, for example, in the information storage area 130, the code generation unit 116 generates a third object code 135c from each of a loop the iteration count of which is not identifiable at the time of compiling and loops respectively having the first value 131 and the second value 132 not greater than or equal to the respective thresholds and stores the third object code 135c in the information storage area 130 (S62).

The code generation unit 116 may thereby generate not only the first object code 135a, the second object code 135b, and the fourth object code 135d but also the third object code 135c generated from a loop nest included in the source code 134 (loop nest having not undergone conversion by the code conversion unit 114).

Figure 16:
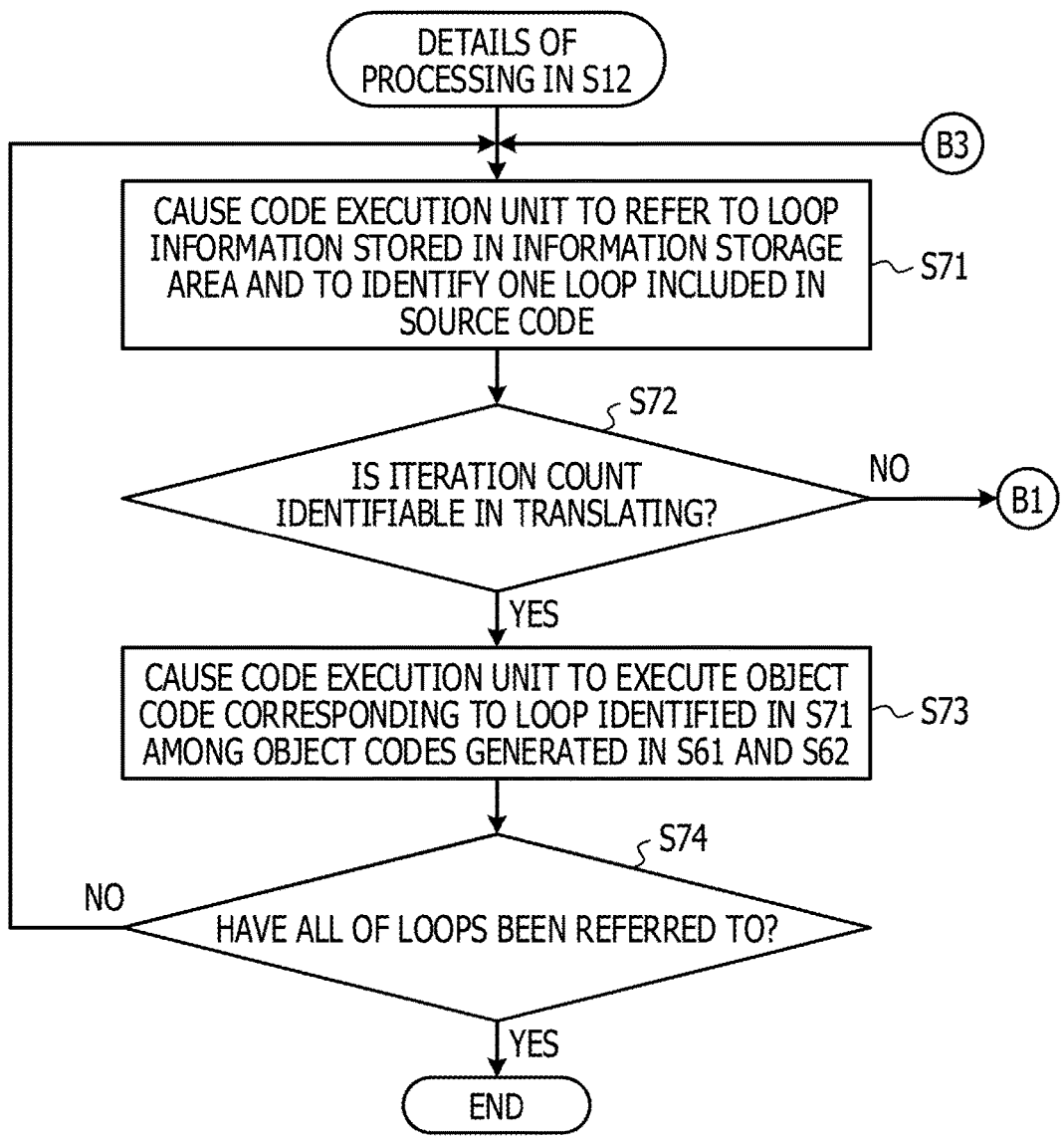
FIG. 16 illustrates an example of processing in S12.
Figure 17:
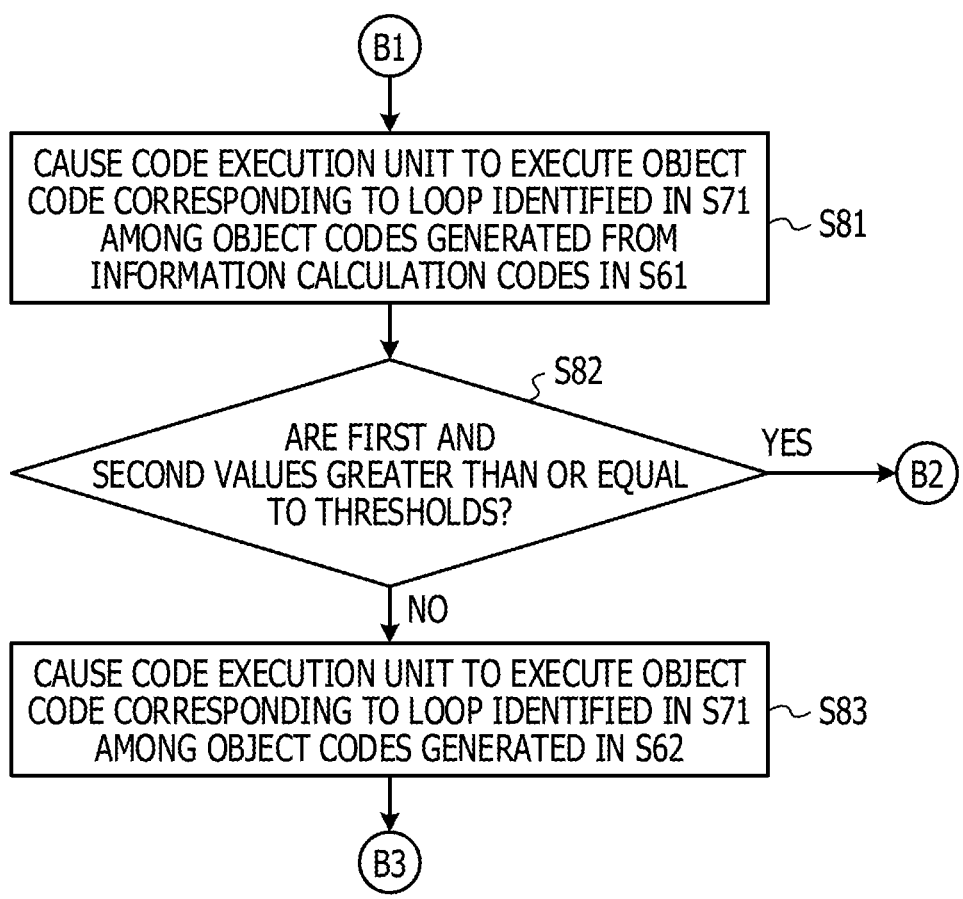
FIG. 17 illustrates the example of the processing in S12.
Figure 18:
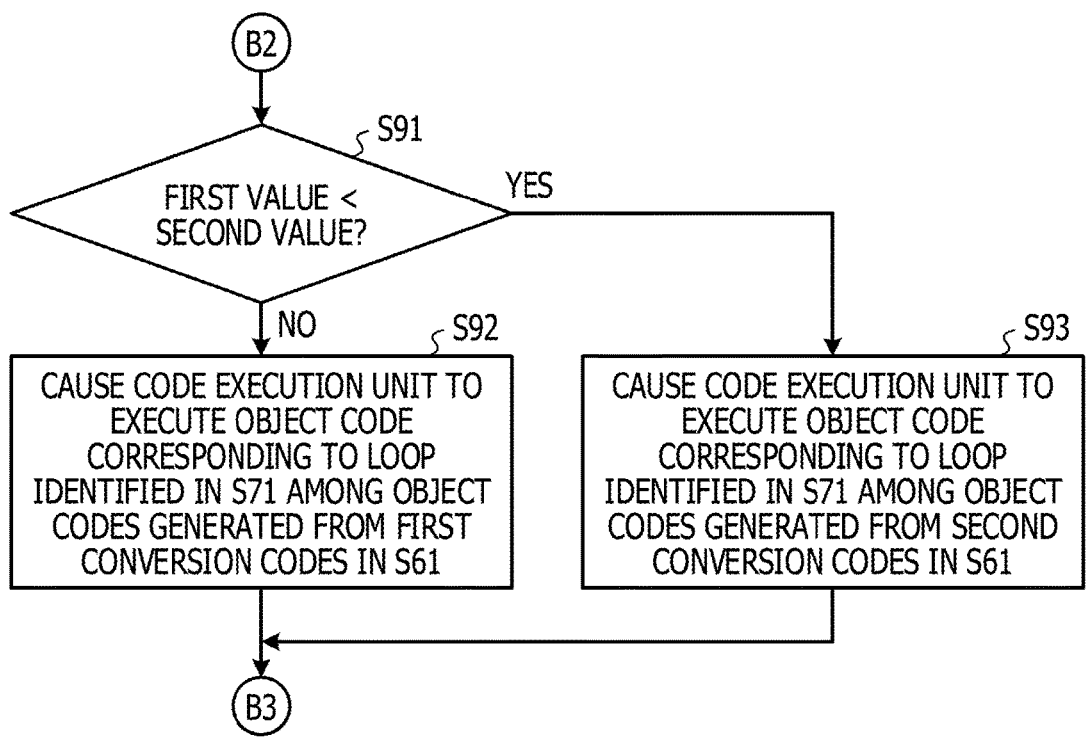
FIG. 18 illustrates the example of the processing in S12.

FIGS. 16 to 18 illustrate an example of the processing in S12. S12 illustrated in FIGS. 16 to 18 may correspond to S12 illustrated in FIG. 3.

As illustrated in FIG. 16, the code execution unit 117 refers to the loop information 133 stored in the information storage area 130 and identifies a loop included in the source code 134 (S71).

It is judged whether the iteration count of the loop identified in the processing in S71 has been identified at the time of compiling (S72).

As a result, if it is judged that the iteration count of the loop identified in the processing in S71 has been identified at the time of compiling (YES in S72), the code execution unit 117 executes an object code 135 corresponding to the loop identified in the processing in S71 among the object codes 135 generated in the processing in S61 and S62 (S73).

For example, if the iteration count of the loop identified in the processing in S71 has been identified at the time of compiling, one of the first object code 135a, the second object code 135b, and the third object code 135c has been stored, as the object code 135 corresponding to the loop identified in the processing in S71, in the information storage area 130. Accordingly, in this case, the code execution unit 117 executes one of the first object code 135a, the second object code 135b, and the third object code 135c.

Thereafter, the code execution unit 117 judges whether every loop included in the loop information 133 has been identified in the processing in S71 (S74).

As a result, if it is judged that every loop included in the loop information 133 has been identified (YES in S74), the information processing apparatus 1 terminates the processing in S12. In contrast, if it is judged that every loop included in the loop information 133 has not been identified yet (NO in S74), the code execution unit 117 again performs the processing in and subsequent to S71.

If it is judged in the processing in S72 that the iteration count of the loop identified in the processing in S71 has not been identified at the time of compiling (NO in S72), the code execution unit 117 executes the object code 135 corresponding to the loop identified in the processing in S71 among the fourth object codes 135d generated from the information calculation codes 134c in the processing in S61, as illustrated in FIG. 17 (S81).

For example, if the iteration count of the loop identified in the processing in S71 has not been identified at the time of compiling, the information storage area 130 has stored therein the first object code 135a, the second object code 135b, the third object code 135c, and the fourth object code 135d to serve as the object code 135 corresponding to the loop identified in the processing in S71. Accordingly, if identification of all of pieces of information for calculating the first value 131 and the second value 132 is performed accompanying execution or the like of a different object code in the code execution process, the code execution unit 117 executes the fourth object code 135d corresponding to the loop identified in the processing in S71.

The code execution unit 117 may thereby calculate the first value 131 and the second value 132 that have not been calculated at the time of compiling.

The code execution unit 117 judges whether the first value 131 and the second value 132 calculated in the processing in S81 are greater than or equal to the respective predetermined thresholds (S82).

As a result, if it is judged that the calculated first value 131 and the second value 132 are not greater than or equal to the respective predetermined thresholds (NO in S82), the code execution unit 117 executes a third object code 135c corresponding to the loop identified in the processing in S71 among the third object codes 135c generated in the processing in S62 (S83).

In contrast, if it is judged that the first value 131 and the second value 132 that are calculated in the processing in S81 are greater than or equal to the respective predetermined thresholds (YES in S82), the code execution unit 117 judges whether the second value 132 calculated in the processing in S81 exceeds the first value 131, as illustrated in FIG. 18 (S91).

If it is judged that the second value 132 does not exceed the first value 131 (NO in S91), the code execution unit 117 executes a first object code 135a corresponding to the loop identified in the processing in S71 among the first object codes 135a generated from the first conversion codes 134a in the processing in S61 (S92).

In contrast, if it is judged that the second value 132 exceeds the first value 131 (YES in S91), the code execution unit 117 executes a second object code 135b corresponding to the loop identified in the processing in S71 among the second object codes 135b generated from the second conversion codes 134b in the processing in S61 (S93).

The CPU may thereby select a conversion method for each loop nest included in the source code 134 based on the iteration count of the loop nest. The CPU may thus reduce the frequency of reading a cache line from the main memory 102 regardless of the iteration count of the loop nests included in the source code 134. Accordingly, the CPU may reduce processing time taken to perform a writing operation for the cache line. The CPU may also improve the performance due to the lowering of the demanded memory throughput.

Figure 19:
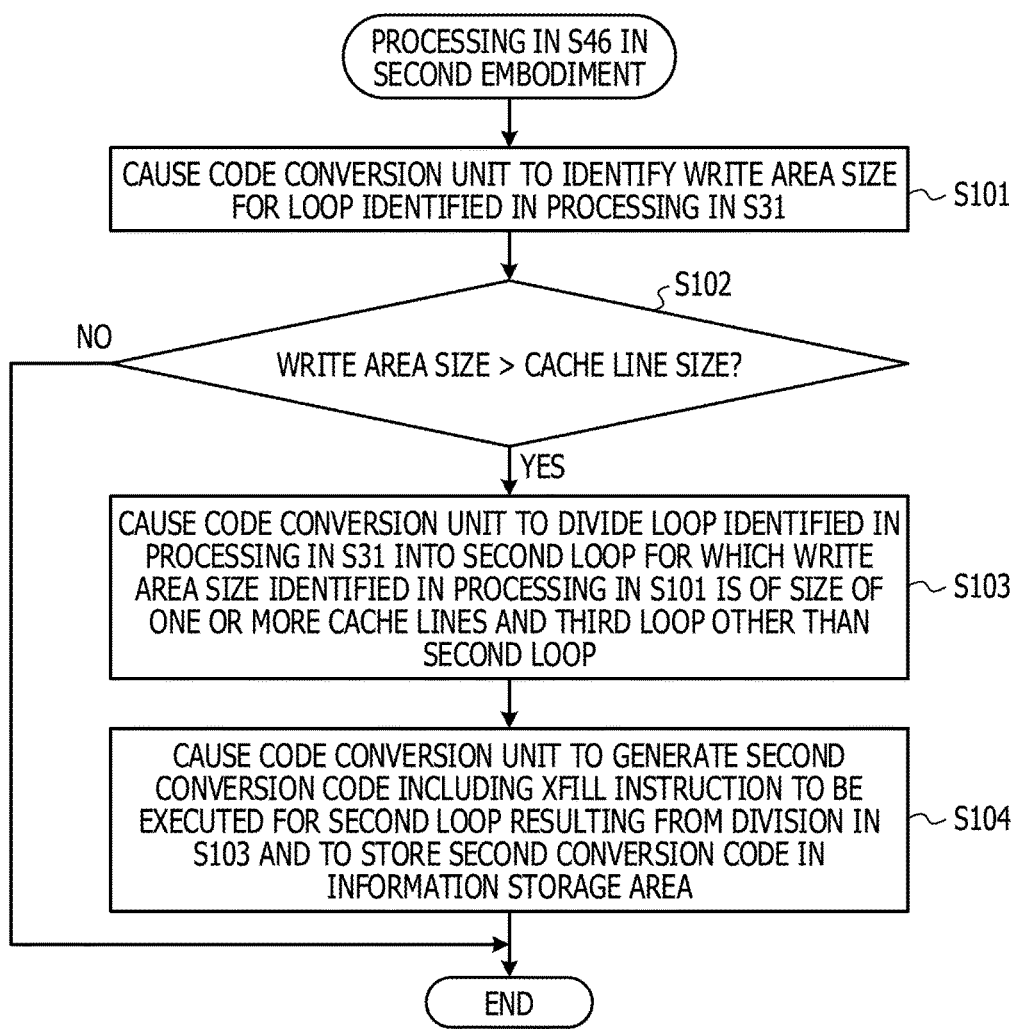
FIG. 19 illustrates an example of the compiling process.

FIG. 19 illustrates an example of the compiling process.

If a write area size for a loop nest (hereinafter, also referred to as a first loop) is larger than a cache line size, the CPU 101 of the information processing apparatus 1 performs division into a loop for which a write area size for the first loop is of a cache line size (hereinafter, also referred to as a second loop) and a loop other than the second loop (hereinafter, also referred to as a third loop). In this case, the CPU 101 generates an XFILL instruction only for the write area size for the second loop.

The CPU 101 may thereby hinder destruction of data stored in the memory 102 accompanying execution of the XFILL instruction.

The compiling process in a first embodiment illustrated in FIGS. 12 to 15 is different from a compiling process illustrated in FIG. 19, for example, in only the processing in S46 described with reference to FIG. 13. Accordingly, only the processing in S46 will hereinafter be described.

As illustrated in FIG. 19, the code conversion unit 114 identifies a write area size for the first loop identified in the processing in S31 (S101).

If the write area size identified in the processing in S101 is larger than the cache line size (YES in S102), the code conversion unit 114 divides the first loop identified in the processing in S31 into a second loop for which the write area size identified in the processing in S101 is of the size of one or more cache lines and a third loop other than the second loop (S103). Thereafter, the code conversion unit 114 generates the second conversion code 134b including the XFILL instruction to be executed for the second loop resulting from the division in the processing in S103 and stores the second conversion code 134b in the information storage area 130 (S104).

In contrast, if the write area size identified in the processing in S101 is not larger than the cache line size (NO in S102), the code conversion unit 114 does not perform the processing in S103 and S104.

For example, if the cache line size is 256 bytes, 32 elements of the elements of the double-precision type array a included in the first loop are arranged on one cache line. Accordingly, if the number of elements in the first dimension of the array a is, for example, 126, the code conversion unit 114 performs the division into the second loop corresponding to 96 elements that are elements of the multiple of the 32 elements arranged on one cache line and the third loop corresponding to 30 elements that are elements less than the 32 elements arranged on one cache line. The code conversion unit 114 generates the XFILL instruction only for the second loop.

The CPU 101 may thereby hinder destruction of data (data other than the array a) stored in the memory 102 accompanying the execution of the XFILL instruction.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable storage medium recording a compiling program which causes a computer to execute a process, the process comprising:
    converting, when a first instruction included in an innermost loop of loop nests of a source code is executed, the source code in such a manner that a second instruction is executed which writes specific data in a target area of a cache memory including one or more cache lines which are written from a main memory by an execution of the first instruction to be executed a specific count later in the innermost loop;
    calculating, when a first conversion code including the second instruction in which an identification of the target area is performed based on a first current iteration count of the first instruction in the innermost loop is executed, a first value, for each loop nest, indicating a first rate by which a count of reading of the one or more cache lines is reduced;
    calculating, when a second conversion code including the first instruction in which an identification of the target area is performed based on a second current iteration count of the first instruction in an outer loop of the innermost loop is executed, a second value, for each loop nest, indicating a second rate by which a count of reading of the one or more cache lines is reduced;
    comparing the first value and the second value for each loop nest; converting a loop nest that has the first value larger than the second value and is included in the loop nests into the first conversion code; and
    converting a loop nest that has the second value larger than the first value and is included in the loop nests into the second conversion code.

2. The non-transitory computer-readable storage medium according to claim 1, wherein a loop nest that has the first value and the second value equal to each other and is included in the loop nests is converted into the first conversion code or the second conversion code.

3. The non-transitory computer-readable storage medium according to claim 1, wherein a loop nest that has the first value and the second that are less than a threshold is not converted.

4. The non-transitory computer-readable storage medium according to claim 1, wherein the second instruction included in the first conversion code is an instruction which writes the specific data in the target area including a cache line which is written by the first instruction to be executed a first count later than the first current iteration count in the innermost loop, and in the calculating of the first value, the first value is calculated by dividing the first count by a loop count of the innermost loop.

5. The non-transitory computer-readable storage medium according to claim 1, wherein the second instruction included in the first conversion code is an instruction which writes the specific data in the target area including a cache line which is written by the first instruction to be executed a second count later than the second current iteration count in the outer loop of the innermost loop, and in the calculating of the first value, the first value is calculated by dividing the first count by a loop count of the innermost loop.

6. The non-transitory computer-readable storage medium according to claim 1, wherein in the calculating of the first value, when all pieces of information used to calculate the first value are acquirable, the first value is calculated, in the calculating of the second value, when all pieces of information used to calculate the second value are acquirable, the second value is calculated, and when the first value or the second value has not been calculated, the first conversion code, the second conversion code, and an information calculation code including instructions to calculate the first value and the second value are generated for each loop nest.

7. The non-transitory computer-readable storage medium according to claim 1, wherein a write area size of the loop nest and a size of the one or more cache lines are compared for each loop nest, a first loop having the write area size larger than the size of the one or more cache lines is divided, for each of the loop nests, into a second loop for which the write area size for the first loop is included in the size of the one or more cache lines and a third loop other than the second loop, and the first loop is converted into the first conversion code or the second conversion code to execute the second instruction for the write area size for the second loop.

8. An information processing apparatus comprising:
    a memory; and
    a processor, coupled to the memory, configured to perform operations of:
        converting, when a first instruction included in an innermost loop of loop nests of a source code is executed, the source code in such a manner that a second instruction is executed which writes specific data in a target area of a cache memory including one or more cache lines which are written from a main memory by an execution of the first instruction to be executed a specific count later in the innermost loop;
        calculating, when a first conversion code including the second instruction in which an identification of the target area is performed based on a first current iteration count of the first instruction in the innermost loop is executed, a first value, for each loop nest, indicating a first rate by which a count of reading of the one or more cache lines is reduced;

calculating, when a second conversion code including the first instruction in which an identification of the target area is performed based on a second current iteration count of the first instruction in an outer loop of the innermost loop is executed, a second value, for each loop nest, indicating a second rate by which a count of reading of the one or more cache lines is reduced;

comparing the first value and the second value for each loop nest; converting a loop nest that has the first value larger than the second value and is included in the loop nests into the first conversion code; and converting a loop nest that has the second value larger than the first value and is included in the loop nests into the second conversion code.

9. The information processing apparatus according to claim 8, wherein a loop nest that has the first value and the second value equal to each other and is included in the loop nests is converted into the first conversion code or the second conversion code.

10. The information processing apparatus according to claim 8, wherein a loop nest that has the first value and the second that are less than a threshold is not converted.

11. The information processing apparatus according to claim 8, wherein the second instruction included in the first conversion code is an instruction which writes the specific data in the target area including a cache line which is written by the first instruction to be executed a first count later than the first current iteration count in the innermost loop, and in the calculating of the first value, the first value is calculated by dividing the first count by a loop count of the innermost loop.

12. The information processing apparatus according to claim 8, wherein the second instruction included in the first conversion code is an instruction which writes the specific data in the target area including a cache line which is written by the first instruction to be executed a second count later than the second current iteration count in the outer loop of the innermost loop, and in the calculating of the first value, the first value is calculated by dividing the first count by a loop count of the innermost loop.

13. The information processing apparatus according to claim 8, wherein in the calculating of the first value, when all pieces of information used to calculate the first value are acquirable, the first value is calculated, in the calculating of the second value, when all pieces of information used to calculate the second value are acquirable, the second value is calculated, and when the first value or the second value has not been calculated, the first conversion code, the second conversion code, and an information calculation code including instructions to calculate the first value and the second value are generated for each loop nest.

14. The information processing apparatus according to claim 8, wherein a write area size of the loop nest and a size of the one or more cache lines are compared for each loop nest, a first loop having the write area size larger than the size of the one or more cache lines is divided, for each of the loop nests, into a second loop for which the write area size for the first loop is included in the size of the one or more cache lines and a third loop other than the second loop, and the first loop is converted into the first conversion code or the second conversion code to execute the second instruction for the write area size for the second loop.

15. A compiling method comprising:
converting, by a computer, when a first instruction included in an innermost loop of loop nests of a source code is executed, the source code in such a manner that a second instruction is executed which writes specific data in a target area of a cache memory including one or more cache lines which are written from a main memory by an execution of the first instruction to be executed a specific count later in the innermost loop;

calculating, when a first conversion code including the second instruction in which an identification of the target area is performed based on a first current iteration count of the first instruction in the innermost loop is executed, a first value, for each loop nest, indicating a first rate by which a count of reading of the one or more cache lines is reduced; calculating, when a second conversion code including the first instruction in which an identification of the target area is performed based on a second current iteration count of the first instruction in an outer loop of the innermost loop is executed, a second value, for each loop nest, indicating a second rate by which a count of reading of the one or more cache lines is reduced; comparing the first value and the second value for each loop nest; converting a loop nest that has the first value larger than the second value and is included in the loop nests into the first conversion code; and converting a loop nest that has the second value larger than the first value and is included in the loop nests into the second conversion code.

16. The compiling method according to claim 15, wherein a loop nest that has the first value and the second value equal to each other and is included in the loop nests is converted into the first conversion code or the second conversion code.

17. The compiling method according to claim 15, wherein a loop nest that has the first value and the second that are less than a threshold is not converted.

18. The compiling method according to claim 15, wherein the second instruction included in the first conversion code is an instruction which writes the specific data in the target area including a cache line which is written by the first instruction to be executed a first count later than the first current iteration count in the innermost loop, and in the calculating of the first value, the first value is calculated by dividing the first count by a loop count of the innermost loop.

19. The compiling method according to claim 15, wherein the second instruction included in the first conversion code is an instruction which writes the specific data in the target area including a cache line which is written by the first instruction to be executed a second count later than the second current iteration count in the outer loop of the innermost loop, and in the calculating of the first value, the first value is calculated by dividing the first count by a loop count of the innermost loop.

20. The compiling method according to claim 15, wherein in the calculating of the first value, when all pieces of information used to calculate the first value are acquirable, the first value is calculated, in the calculating of the second value, when all pieces of information used to calculate the second value are acquirable, the second value is calculated, and when the first value or the second value has not been calculated, the first conversion code, the second conversion code, and an information calculation code including instructions to calculate the first value and the second value are generated for each loop nest.

\* \* \* \* \*